(12) United States Patent
Ahn (10) Patent No.: US 11,807,200 B2
(45) Date of Patent: Nov. 7, 2023

(54) HYDRAULIC BLOCK OF ELECTRONIC BRAKING DEVICE FOR VEHICLE

(71) Applicant: Hyundai Mobis Co., Ltd., Seoul (KR)

(72) Inventor: Sung Ki Ahn, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 359 days.

(21) Appl. No.: 17/126,150

(22) Filed: Dec. 18, 2020

(65) Prior Publication Data

US 2022/0135011 A1  May 5, 2022

(30) Foreign Application Priority Data

Nov. 3, 2020 (KR) .......................... 10-2020-0145117

(51) Int. Cl.
| | |
|---|---|
| *B60T 13/14* | (2006.01) |
| *B60T 17/04* | (2006.01) |
| *B60T 15/02* | (2006.01) |
| *F15B 13/08* | (2006.01) |
| *F15B 1/04* | (2006.01) |

(Continued)

(52) U.S. Cl.
CPC .......... *B60T 13/141* (2013.01); *B60T 8/4809* (2013.01); *B60T 15/028* (2013.01); *B60T 17/04* (2013.01); *F15B 1/04* (2013.01); *F15B 13/0814* (2013.01); *B60T 2270/10* (2013.01);

(Continued)

(58) Field of Classification Search
CPC .... B60T 13/141; B60T 8/4809; B60T 15/028; B60T 17/04; B60T 2270/10; B60T 2270/203; B60T 2270/402; F15B 1/04; F15B 13/0814; F15B 13/002
See application file for complete search history.

(56) References Cited

U.S. PATENT DOCUMENTS 6,213,568 B1 * 4/2001 Feigel ..................... B60T 8/367
303/114.1
2006/0238024 A1 * 10/2006 Akita .................... B60T 8/4081
303/155

(Continued)

FOREIGN PATENT DOCUMENTS

| CN | 105270370 A | 1/2016 |
|---|---|---|
| DE | 102014221544 | 4/2016 |

(Continued)

OTHER PUBLICATIONS

Office Action dated Jun. 28, 2023 from the Chinese Patent Office for Chinese Patent Application No. 202011540856X.

*Primary Examiner* — Patrick C Williams
(74) *Attorney, Agent, or Firm* — H.C. Park & Associates, PLC (57) ABSTRACT

A hydraulic block of an electronic braking device for a vehicle includes a first input port and a second input port configured to receive a brake fluid from a main braking system, at least one oil chamber connected to one input port of the first input port and the second input port, a first output port and a second output port configured to discharge the brake fluid to a plurality of wheel brake apparatuses, a first inlet line configured to connect the first input port and the first output port to each other, and a second inlet line configured to connect the second input port and the second output port to each other, a first outlet line bifurcated from the first inlet line, a second outlet line bifurcated from the second inlet line, and a valve mounting unit mounted with a plurality of valves.

8 Claims, 3 Drawing Sheets

(51) Int. Cl.
_B60T 8/48_  (2006.01)
_F15B 13/00_  (2006.01)

(52) U.S. Cl.
CPC ... *B60T 2270/203* (2013.01); *B60T 2270/402* (2013.01); *F15B 2013/002* (2013.01)

(56) References Cited

U.S. PATENT DOCUMENTS

| | | | | |
|---|---|---|---|---|
| 2007/0210642 | A1* | 9/2007 | Niino | B60T 13/18 |
| | | | | 303/11 |
| 2009/0000467 | A1* | 1/2009 | Kratzer | F15B 13/0853 |
| | | | | 91/459 |
| 2013/0319562 | A1* | 12/2013 | Weh | F15B 13/0803 |
| | | | | 137/884 |
| 2014/0309904 | A1* | 10/2014 | Ko | B60T 15/028 |
| | | | | 701/78 |
| 2015/0007559 | A1* | 1/2015 | Oosawa | B60T 11/26 |
| | | | | 60/585 |
| 2015/0375728 | A1 | 12/2015 | Kuhlman | |
| 2016/0107626 | A1* | 4/2016 | Jeon | B60T 7/042 |
| | | | | 303/15 |
| 2017/0158182 | A1* | 6/2017 | Foitzik | B60T 13/745 |
| 2019/0100218 | A1 | 4/2019 | Kim | |
| 2021/0316708 | A1 | 10/2021 | Kim | |

FOREIGN PATENT DOCUMENTS

| | | |
|---|---|---|
| DE | 102018214969 | 4/2019 |
| DE | 112019004003 | 5/2021 |
| KR | 10-2020-0017721 | 2/2020 |

\* cited by examiner

FIG. 3

HYDRAULIC BLOCK OF ELECTRONIC BRAKING DEVICE FOR VEHICLE

CROSS-REFERENCE TO RELATED APPLICATION

This application claims priority from and the benefit of Korean Patent Application No. 10-2020-0145117, filed on Nov. 3, 2020, which is hereby incorporated by reference for all purposes as if set forth herein.

BACKGROUND

Field

Exemplary embodiments relate to a hydraulic block of an electronic braking device for a vehicle.

DISCUSSION OF THE BACKGROUND

The statements in this section merely provide background information related to the present disclosure and may not constitute prior art.

A vehicle for autonomous driving secures a fail-safe function using an auxiliary braking system disposed between a main braking system and a plurality of wheel brake apparatuses when a malfunction occurs in the main braking system.

A conventional auxiliary braking system performs a two-channel pressure increasing/decreasing control operation and a two-channel pressure decreasing control operation. For example, the conventional auxiliary braking system performs a function of increasing/decreasing pressure of a front wheel and a function of decreasing pressure of a rear wheel. To this end, four input pipes and four output pipes (a total of eight pipes) need to be connected to the auxiliary braking system. As a result, there is a problem in that a manufacturing cost and a weight of the braking system are increased and an assembly work for manufacturing the braking system becomes complicated.

The above information disclosed in this Background section is only for enhancement of understanding of the background of the invention and, therefore, it may contain information that does not constitute prior art.

SUMMARY

According to an aspect of the invention, a hydraulic block of an electronic braking device for a vehicle includes an auxiliary braking system capable of performing a two-channel pressure increasing/decreasing control operation and a one-channel pressure decreasing control operation.

Aspects which can be achieved by the invention are not limited what has been disclosed herein above and other aspects can be clearly understood from the following description by those skilled in the art.

According to an exemplary embodiment of the inventive concepts, there is provided a hydraulic block of an electronic braking device for a vehicle including a first input port and a second input port configured to receive a brake fluid from a main braking system, at least one oil chamber of a plurality of oil chambers connected to one input port of the first input port and the second input port, the at least one oil chamber configured to receive and store a brake fluid from the one input port of the first input port and the second input port, a first output port and a second output port configured to discharge the brake fluid to a plurality of wheel brake apparatuses, a first inlet line configured to connect the first input port and the first output port to each other, and a second inlet line configured to connect the second input port and the second output port to each other, a first outlet line bifurcated from the first inlet line, the first outlet line connected to the at least one oil chamber of the plurality of oil chambers, a second outlet line bifurcated from the second inlet line, the second outlet line connected to a remaining oil chamber of the plurality of oil chambers, and a valve mounting unit mounted with a plurality of valves for opening operations and closing operations of the first inlet line, the second inlet line, the first outlet line, and the second outlet line.

As described above, according to exemplary embodiments, a hydraulic block of an electronic braking device for a vehicle may include an auxiliary braking system capable of performing a two-channel pressure increasing/decreasing control operation and a one-channel pressure decreasing control operation, thereby reducing a manufacturing cost and making assembly work easier.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, exemplary embodiments will be described in detail with reference to the accompanying drawings. Regarding the reference numerals assigned to the components in the drawings, the same components will be designated by the same reference numerals, wherever possible, even though they are shown in different drawings. In addition, in the description of exemplary embodiments, detailed description of well-known related structures or functions will be omitted when it is deemed that such description will obscure the gist of the invention.

Terms such as first, second, (i), (ii), (a), (b), and the like may be used herein to describe components of the exemplary embodiments. These terms are only used to distinguish one component from another component, and essential, order, or sequence of corresponding components are not limited by these terms. Terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Figure 1:
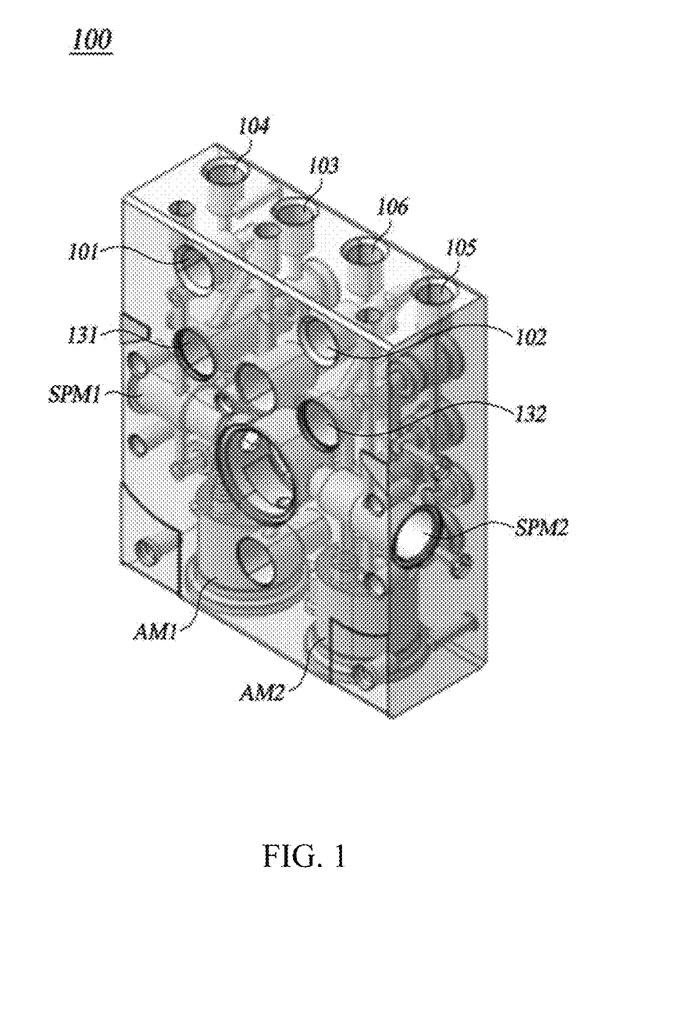
FIG. 1 is a perspective view illustrating a hydraulic block of an electronic braking device for a vehicle according to an exemplary embodiment.

FIG. 1 is a perspective view illustrating a hydraulic block of an electronic braking device for a vehicle according to an exemplary embodiment.

Figure 3:
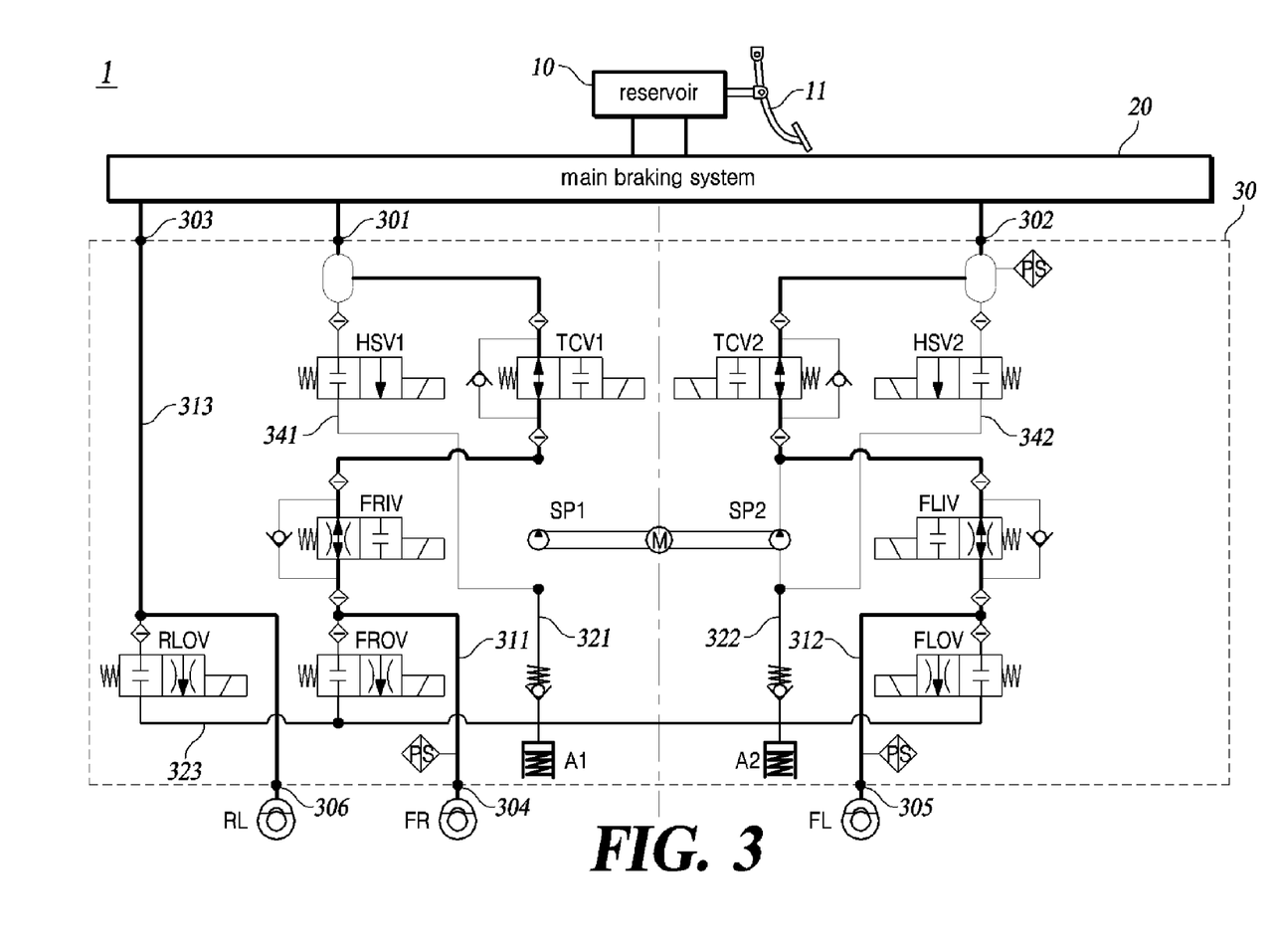
FIG. 3 is a diagram illustrating a hydraulic circuit in a hydraulic block of an electronic braking device for a vehicle according to an exemplary embodiment.

A hydraulic block of an electronic braking device for a vehicle 100 illustrated in FIG. 1 may be different from a hydraulic circuit diagram in FIG. 3 that conceptually illustrates each component for the purpose of description, in terms of a position of a line.

In addition, a wheel brake apparatus with hydraulic pressure regulated by the hydraulic block of an electronic braking device for a vehicle 100 according to an exemplary embodiment is illustrated as a front right wheel brake apparatus FR, a front left wheel brake apparatus FL, and a rear left wheel brake apparatus RL, but this configuration is merely an example, and the wheel brake apparatus may be any three of front right, front left, rear right, and rear left wheel brake apparatuses.

Referring to FIG. 1, the hydraulic block of an electronic braking device for a vehicle may include input port units 101, 102 and 103, three output port units 104, 105 and 106, two oil chambers 131 and 132, two accumulator mounting unit AM1 and AM2, two hydraulic pump mounting units SPM1 and SPM2, and a plurality of valve mounting units. In addition, a plurality of solenoid valves, an inlet line, an outlet line, a circulation line, and the like included in the hydraulic block of an electronic braking device for a vehicle 100 will be described in more detail with reference to FIG. 3.

Referring to FIGS. 1 and 3, the hydraulic block of an electronic braking device for a vehicle 100 may represent an auxiliary braking system 30 in a braking system. That is, the hydraulic block of an electronic braking device for a vehicle 100 may serve to transmit a brake fluid discharged from a main braking system 20 to a plurality of wheel brake apparatuses FR, FL and RL. The auxiliary braking system 30 may be represented as a hydraulic circuit diagram in FIG. 3 in the form of the hydraulic circuit diagram, and may be represented as the hydraulic block in FIG. 1 in the form of a hydraulic block.

The input port units 101, 102 and 103 may include a first input port 101, a second input port 102, and a third input port 103.

The first input port 101 may correspond to a first hydraulic pressure input unit 301 in FIG. 3, and the second input port 102 may correspond to a second hydraulic pressure input unit 302 in FIG. 3, and the third input port 103 may correspond to a third hydraulic pressure input unit 303 in FIG. 3. The input port units 101, 102 and 103 may be a port through which the brake fluid discharged from the main braking system is introduced into the hydraulic block of an electronic braking device for a vehicle 100.

The brake fluid introduced by the input port units 101, 102 and 103 may passes through inlet lines 311, 312 and 313 in FIG. 3. To this end, the input port units 101, 102 and 103 may be disposed in an outer periphery of the hydraulic block, i.e., at a boundary. An auxiliary braking system 30 according to an exemplary embodiment may include a first inlet line 311, a second inlet line 312, and a third inlet line 313, and the hydraulic block of an electronic braking device for a vehicle 100 may include a first input port 101, a second input port 102, and a third input port 103 corresponding to the first hydraulic pressure input unit 301, the second hydraulic pressure input unit 302, and the third hydraulic pressure input unit 303.

The output port unit 104, 105 and 106 may include a first output port 104, a second output port 105, and a third output port 106.

The first output port 104 may correspond to a first hydraulic pressure output unit 304 in FIG. 3, and the second output port 105 may correspond to a second hydraulic pressure output unit 305 in FIG. 3, and the third output port 106 may correspond to a third hydraulic pressure output unit 306 in FIG. 3. The output port unit 104, 105 and 106 may be disposed on a line through which the brake fluid discharged from the hydraulic block of an electronic braking device for a vehicle 100 is introduced into the plurality of wheel brake apparatuses FR, FL, and RL. The output port unit 104, 105 and 106 allow the inlet lines 311, 312 and 313 to be in fluid communication with the plurality of wheel brake apparatuses FR, FL, and RL.

The oil chambers 131 and 132 may be spaces in which the brake fluid introduced from the first input port 101 and the second input port 102 is temporarily stored. More specifically, the brake fluid introduced from the first input port 101 may be stored in the first oil chamber 131, and the brake fluid introduced from the second input port 102 may be stored in the second oil chamber 132.

The accumulator mounting units AM1 and AM2 and the hydraulic pump mounting units SPM1 and SPM2 may be spaces mounted with an accumulator and a hydraulic pump illustrated in FIG. 3.

A plurality of valve mounting unit may be a mounting unit mounted with each solenoid valve illustrated in detail in FIG. 3.

A conventional hydraulic block may include four input ports and four output ports to constitute a total of 8 brake pipes. Accordingly, the conventional hydraulic block may have a complicated layout of a brake piping structure.

However, the hydraulic block of an electronic braking device for a vehicle 100 according to an exemplary embodiment is configured to use three input port units 101, 102 and 103, and three output port units 104, 105 and 106 to perform a pressure increasing/decreasing control operation on two wheels and a pressure decreasing control operation on one wheel. Accordingly. There is an advantage in that the design of a brake piping structure in the hydraulic block is simplified and a manufacturing cost is reduced.

Figure 2:
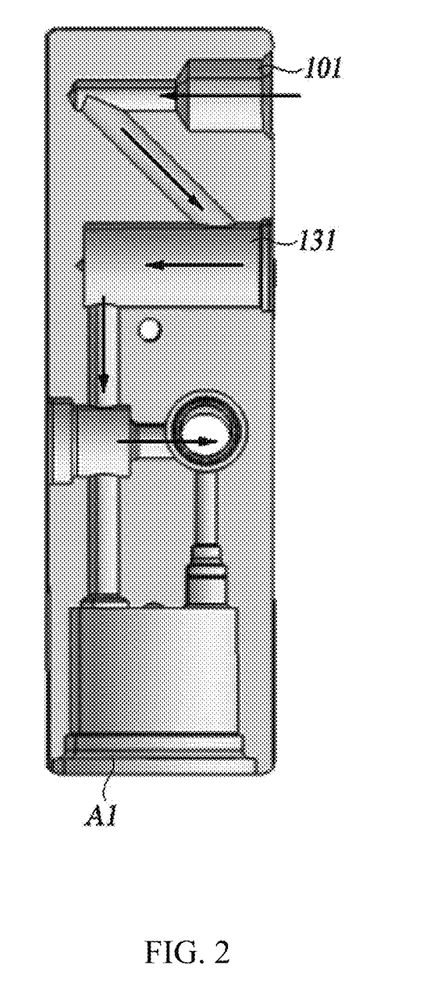
FIG. 2 is a side view illustrating a hydraulic block of an electronic braking device for a vehicle according to an exemplary embodiment.

FIG. 2 is a side view illustrating a hydraulic block of an electronic braking device for a vehicle according to an exemplary embodiment.

Referring to FIG. 2, an arrow may indicate a route through which brake fluid is introduced into the hydraulic block of an electronic braking device for a vehicle 100, and flows along a line.

For example, the brake fluid may be introduced into the first input port 101, and may flow along the first inlet line. The first oil chamber 131 may be disposed on the inlet line, and a high-pressure switching valve (HSV) connected to the hydraulic pump and a traction control valve (TCV) connected to a wheel side may be disposed on a lower portion of the first oil chamber 131. Accordingly, the hydraulic block of an electronic braking device for a vehicle 100 may constitute a layout such that the brake fluid introduced into the first input port 101 flows into the hydraulic pump and the plurality of wheel brakes through the first oil chamber 131.

FIG. 3 is a diagram illustrating a hydraulic circuit in a hydraulic block of an electronic braking device for a vehicle according to an exemplary embodiment.

Referring to FIG. 3, the hydraulic circuit in the hydraulic block of an electronic braking device for a vehicle 100 in FIG. 1 according to an exemplary embodiment is illustrated as the auxiliary braking system 30 in FIG. 3.

In addition, in the descriptions, terms "forward" and "backward" described with respect to a relative position of a line may respectively represent a portion disposed at a closer distance from a reservoir 10, and a portion disposed at a greater distance from the reservoir 10, when the brake fluid flows. However, these terms not only may mean that it is directly forward or backward in succession, but also may mean a relatively further line even when spaced apart.

In addition, in FIG. 3, the inlet line is marked with a dark thick line, the outlet line is marked with a dark thin line, and the circulation line is marked with a bright thin line.

In addition, specific components of the reservoir 10, a brake pedal 11, and a main braking system 20 according to an exemplary embodiment may be easily implemented by those skilled in the art, and thus specific illustrations and descriptions related thereto are omitted.

Referring to FIG. 3, an electrohydraulic brake system 1 may include all or some of the reservoir 10, the brake pedal 11, the main braking system 20, and the auxiliary braking system 30.

The reservoir 10 is configured to store a brake fluid therein.

The brake pedal 11 may control a piston disposed in a master cylinder of the main braking system 20 to perform a translational motion by pedaling of a user.

The plurality of wheel brake apparatuses FR, FL, and RL generate braking forces in a plurality of wheels by using hydraulic pressure of the brake fluid discharged from the reservoir 10. When the driver depresses the brake pedal 11, an electric control unit senses a braking request of the driver by using a pedal travel sensor (PTS). The control unit, which senses the braking request of the driver, may generate a braking signal. Here, the braking signal may be an electrical signal that is transmitted so as to control the respective braking systems 20 and 30 to generate a braking force in accordance with the amount of pedaling of the driver performed on the brake pedal 11.

The main braking system 20 may be disposed between the reservoir 10 and the plurality of wheel brake apparatuses FR, FL, and RL, and are configured to transmit the brake fluid discharged from the reservoir 10 to the plural wheel brake apparatuses FR, FL, and RL, and to control the hydraulic pressure of the brake fluid. When a failure occurs in at least some of components of the main braking system 20, the control unit may transmit an auxiliary braking signal to the auxiliary braking system 30. When the auxiliary braking signal is transmitted by the control unit to the auxiliary braking system 30, all or some of components of the auxiliary braking system 30 may be actuated. As a result, the electrohydraulic brake system 1 performs a fail-safe function.

The auxiliary braking system 30 may be disposed between the main braking system 20 and the plurality of wheel brake apparatuses FR, FL, and RL. In case that a failure occurs in the main braking system 20 during autonomous driving of a vehicle, or in case that a failure occurs in the main braking system 20 when the driver intervenes in direct braking, the auxiliary braking system 30 may be actuated.

The auxiliary braking system 30 may include all or some of the hydraulic pressure input units 301, 302, and 303, hydraulic pressure output units 304, 305, and 306, inlet lines 311, 312 and 313, an actuating unit, traction control valves TCV1 and TCV2, inlet valves FRIV and FLIV, outlet lines 321, 322, and 323, outlet valves FROV, FLOV, and RLOV, accumulators A1 and A2, oil chambers 131 and 132, circulation lines 341 and 342, and high-pressure switching valves HSV1 and HSV2.

At least one of the hydraulic pressure input units 301, 302, and 303 may be disposed on a line through which the brake fluid discharged from the main braking system 20 is introduced into the auxiliary braking system 30. The hydraulic pressure input units 301, 302, and 303 control the inlet lines 311, 312 and 313 to be in fluid communication with the main braking system 20. To this end, the hydraulic pressure input units 301, 302, and 303 may be disposed at a boundary of the auxiliary braking system 30. The auxiliary braking system 30 according to the illustrated exemplary embodiment may include the first inlet line 311, the second inlet line 312, and the third inlet line 313, and accordingly the auxiliary braking system 30 may include the first hydraulic pressure input unit 301, the second hydraulic pressure input unit 302, and the third hydraulic pressure input unit 303.

At least one of the hydraulic pressure output units 304, 305, and 306 may be disposed on a line through which the brake fluid discharged from the auxiliary braking system 30 is introduced into the plurality of wheel brake apparatuses FR, FL, and RL. The hydraulic pressure output units 304, 305, and 306 control the inlet lines 311, 312 and 313 to be in fluid communication with the plurality of wheel brake apparatuses FR, FL, and RL. The auxiliary braking system 30 according to the illustrated exemplary embodiment may include the first hydraulic pressure output unit 304, the second hydraulic pressure output unit 305, and the third hydraulic pressure output unit 306.

The inlet lines 311, 312 and 313 may be formed between the hydraulic pressure input units 301, 302, and 303, and the hydraulic pressure output units 304, 305, and 306, and may transmit the brake fluid discharged from the main braking system 20 to the plurality of wheel brake apparatuses FR, FL, and RL. The inlet lines 311, 312 and 313 may include the first inlet line 311, the second inlet line 312, and the third inlet line 313.

The first inlet line 311 is configured to transmit all or a part of the brake fluid discharged from the main braking system 20 to the first wheel brake apparatus FR. In addition, the second inlet line 312 is configured to transmit all or a part of the brake fluid discharged from the main braking system 20 to the second wheel brake apparatus FL.

Hydraulic pressure of a fluid flowing in the first inlet line 311 and the second inlet line 312 may be increased by the actuating unit. The actuating unit may include a motor configured to actuate a first pump SP1 and a second pump SP2. An outlet portion of the first pump SP1 may be connected to a point on the first inlet line 311. An outlet portion of the second pump SP2 may be connected to a point on the second inlet line 312. When at least one of the first pump SP1 and the second pump SP2 is actuated, internal hydraulic pressure of at least one of the inlet lines 311 and 312 connected to the respective first and second pumps SP1 and SP2 may be increased.

A first traction control valve TCV1 may be disposed at a point on the first inlet line 311, and may regulate an opening operation and a closing operation of the first inlet line 311. At this time, the first traction control valve TCV1 may be disposed forward a point at which the first inlet line 311 and the outlet portion of the first pump SP1 are connected to each other. The first traction control valve TCV1 may be formed as a normal-open type traction control valve. Accordingly, in the case of a non-powered mode to which the auxiliary braking signal is not applied, the first traction control valve TCV1 may be opened. When the first traction control valve TCV1 is closed, a part of the brake fluid with pressure increased by the first pump SP1 may not flow back to the main braking system 20.

A first inlet valve FRIV may be disposed at another point on the first inlet line 311, and may regulate opening and closing of the first inlet line 311. The first inlet valve FRIV may be disposed backward a point at which the first inlet line 311 and the outlet portion of the first pump SP1 are connected to each other. The first inlet valve FRIV may be formed as a normal-open type inlet valve. Accordingly, in the case of the non-powered mode to which the auxiliary braking signal is not applied, the first inlet valve FRIV may be opened. When the first inlet valve FRIV is closed, a part of the brake fluid with pressure increased by the first pump SP1 may not be transmitted to the wheel brake apparatus FR. As a result, pressure of the brake fluid may be regulated.

The descriptions of the second inlet line 312, a second traction control valve TCV2, and a second inlet valve FLIV are similar to the descriptions of the first inlet line 311, the first traction control valve TCV1, and the first inlet valve FRIV, respectively. Thus, the descriptions of the second inlet line 312, a second traction control valve TCV2, and a second inlet valve FLIV are omitted for descriptive convenience.

The third inlet line 313 is configured to transmit all or a part of the brake fluid discharged from the main braking system 20 to the third wheel brake apparatus RL. When the auxiliary braking signal is applied by the control unit, a line connected to the third hydraulic pressure input unit 303 may have a short circuit structure in the main braking system 20. Accordingly, when the auxiliary braking signal is applied by the control unit, the third inlet line 313 may be directly connected to the reservoir 10. As a result, when the driver intervenes in braking, hydraulic pressure increased by pedaling of the brake pedal 11 may be directly transmitted to the third wheel brake apparatus RL.

The pressure of the third inlet line 313 may not be increased by the actuating unit, and only the pressures of the first inlet line 311 and the second inlet line 312 may be increased by the actuating unit. Accordingly, the auxiliary braking system 30 according to the illustrated exemplary embodiment may be capable of performing a two-channel pressure increasing control operation.

The outlet lines 321, 322, and 323 may be respectively connected to points on the inlet lines 311, 312 and 313, and thus at least a part of the brake fluid in the inlet lines 311, 312 and 313 may be bifurcated. For example, at least a part of the brake fluid in the inlet lines 311, 312 and 313 may include two divided branches or parts.

The outlet lines 321, 322, and 323 may include a first outlet line 321, a second outlet line 322, and a third outlet line 323.

The first outlet line 321 may have one end connected to a bifurcation point on the first inlet line 311 formed backward the second inlet valve FRIV, and the other end connected to an inlet portion of the third pump SP1.

A first outlet valve FROV may be disposed at a point on the first outlet line 321, and may regulate an opening operation and a closing operation of the first outlet line 321. The first outlet valve FROV may be formed as a normal-close type outlet valve. Accordingly, in the case of the non-powered mode to which the auxiliary braking signal is not applied, the first outlet valve FROV may be closed. When the first outlet valve FROV is opened, at least a part of the brake fluid with the increased pressure flowing in the first inlet line 311 may be discharged to the first outlet line 321. As a result, the hydraulic pressure transmitted to the first wheel brake apparatus FR may be decreased.

A first accumulator A1 may be further disposed at another point on the first outlet line 321 formed backward the first outlet valve FROV. The first accumulator A1 is configured to temporarily receive all or a part of the brake fluid transmitted from the first outlet line 321. Accordingly, damage to the first outlet line 321 caused by pulsation of the brake fluid may be minimized. Here, the damage to the first outlet line 321 may include, for example, fatigue, transformation, abrasion, or the like occurring in at least a part of a line, when the line is exposed to continuous pulsation for a long period of time.

The descriptions of the second outlet line 322, a second output valve FLOV, and a second accumulator A2 are similar to the descriptions of the first outlet line 321, the first output valve FLOV, and the first accumulator A1, respectively. The descriptions of the second outlet line 322, a second output valve FLOV, and a second accumulator A2 are omitted for descriptive convenience.

The control unit of the auxiliary braking system 30 according to the illustrated exemplary embodiment may determine whether the accumulators A1 and A2 are used or not according to a required braking amount. For example, in the case of a slow braking operation, only some of the respective outlet valves FROV, FLOV and RLOV may be opened, and thus only the brake fluid may pass through the opened outlet lines 321, 322, and 323 to be bifurcated from the inlet lines 311, 312 and 313. At this time, since an amount of the bifurcated brake fluid is relatively small in comparison to that of a sudden braking operation, the brake fluid may not need to be received in the accumulators A1 and A2. However, in the case of a sudden braking operation, all of the outlet valves FROV, FLOV and RLOV may be opened, and thus the brake fluid may pass through all of the outlet lines 321, 322, and 323 to be bifurcated from the inlet lines 311, 312 and 313. At this time, since an amount of the bifurcated brake fluid is large in comparison to that of a slow braking operation, the brake fluid may be received in the accumulators A1 and A2.

The third outlet line 323 may have one end connected to one point on the third inlet line 313, and the other end connected to the first outlet line 321. At this time, a point, at which the third outlet line 323 and the first outlet line 321 are connected to each other, may be formed backward the first outlet valve FROV. As a result, the brake fluid transmitted by the third outlet line 323 may be summed (merged) with the brake fluid flowing in the first outlet line 321.

The third outlet line 323 may be connected to at least one of the first outlet line 321 and the second outlet line 322. For example, as illustrated in FIG. 1, the first outlet line 321 and the second outlet line 322 may be connected to each other, and may be in fluid communication with each other. In this case, the brake fluid transmitted by the third outlet line 323 may be received in at least one of the first accumulator A1 and the second accumulator A2. However, exemplary embodiments are not limited thereto. For example, the first outlet line 321 and the second outlet line 322 may not be connected to each other. In this case, the brake fluid transmitted by the third output line 323 may flow only into the first outlet line 321, and may be received only in the first accumulator A1.

A third outlet valve RLOV may be disposed at a point on the third outlet line 323, and may regulate an opening operation and a closing operation of the third output line 323. The third outlet valve RLOV may be formed as a normal-close type outlet valve. Accordingly, in the case of the non-powered mode, the third outlet valve RLOV may be closed. When the third outlet valve RLOV is opened, at least a part of the brake fluid with the increased pressure flowing in the first inlet line 311 may be bifurcated into the first outlet line 321. As a result, the hydraulic pressure transmitted to the third wheel brake apparatus RL may be decreased.

In the auxiliary braking system 30 according to the illustrated exemplary embodiment, when the outlet valves FROV, FLOV, and RLOV are opened, the hydraulic pressure supplied to the plurality of wheel brake apparatuses FR, FL, and RL may be decreased. For example, the auxiliary braking system 30 may be capable of performing a three-channel pressure decreasing control operation.

To summarize the above descriptions, the auxiliary braking system 30 according to an exemplary embodiment may not be involved in a pressure increasing/decreasing control operation of the rear right wheel brake apparatus. For example, the auxiliary braking system 30 may be capable of performing a two-channel pressure increasing/decreasing control operation and a one-channel pressure decreasing control operation. Accordingly, the auxiliary braking system 30 according to the illustrated exemplary embodiment may include three lines connected to three hydraulic pressure input units 301, 302, and 303 and three lines connected to three hydraulic pressure output units 304, 305, and 306. For a four-channel pressure increasing/decreasing control operation of the conventional auxiliary braking system, at least eight lines may need to be connected to the auxiliary braking system, whereas the auxiliary braking system 30 according to the illustrated exemplary embodiment may be capable of performing an auxiliary braking operation even when a total of six lines are connected thereto. Accordingly, the electro-hydraulic brake system 1 may have an effect of reducing a manufacturing cost. Furthermore, when a vehicle is manufactured, a wiring operation for the auxiliary braking system 30 may be simplified, thereby improving convenience in assembling the vehicle.

The first oil chamber 131 may be further disposed on the first inlet line 311. At this time, the first oil chamber 131 may be disposed forward the first traction control valve TCV1. The first oil chamber 131 may temporarily receive at least a part of the brake fluid discharged from the main braking system 20 therein.

The circulation lines 341 and 342 may have one ends connected to the oil chambers 131 and 132, and the other ends adjacent to inlet portions of the pumps SP1 and SP2 to be connected to the outlet lines 321 and 322. At this time, points, at which the other ends of the circulation lines 341 and 342 are connected to the outlet lines 321 and 322, may be preferably formed backward the accumulators A1 and A2. As a result, the brake fluid discharged from the accumulators A1 and A2 and the oil chambers 131 and 132 may be supplied to the actuating unit, and thus a sufficient amount of brake fluid required for the actuating unit to be actuated may be supplied.

A first high-pressure switching valve HSV1 may be disposed at a point on a first circulation line 341, and may regulate an opening operation and a closing operation of the first circulation line 341. The first high-pressure switching valve HSV1 may be formed as a normal-close type switching valve. Accordingly, in the case of the non-powered mode, the first high-pressure switching valve HSV1 may be closed. When the first high-pressure switching valve HSV1 is opened, at least a part of the brake fluid received in the first oil chamber 131 may be supplied to the actuating unit.

The descriptions of a second circulation line 342 and a second high-pressure switching valve HSV2 are similar to the descriptions of the first circulation line 341 and the first high-pressure switching valve HSV1. The descriptions of a second circulation line 342 and a second high-pressure switching valve HSV2 are omitted for descriptive convenience.

In case that hydraulic pressure supplied from the reservoir 10 is not sufficient for a braking operation when the auxiliary braking signal is applied, at least a part of the brake fluid received in the oil chambers 131 and 132 may be supplied to the actuating unit. As a result, in comparison to a case where the pressure is increased by the brake fluid supplied from only the reservoir 10, the auxiliary braking system 30 according to the illustrated exemplary embodiment may have a quick responsiveness.

The above descriptions are merely illustrative of technical ideas of exemplary embodiments, and it should be apparent to those skilled in the art to which exemplary embodiments belong that various modifications, combinations, and alternations can be made without departing from the spirit and scope of exemplary embodiments. Therefore, exemplary embodiments are to be considered in a descriptive sense only, and not for purposes of limitation. The present disclosure is thus not limited to the exemplary embodiments described above, and rather intended to include the following appended claims, and all modifications, equivalents, and alternatives falling within the scope of the following claims.

What is claimed is:

1. A hydraulic block of an electronic braking device for a vehicle, the hydraulic block comprising:
    a first input port, a second input port, and a third input port, each configured to receive a brake fluid from a main braking system;
    at least one oil chamber of a plurality of oil chambers connected to one input port of the first input port and the second input port, the at least one oil chamber configured to receive and store a brake fluid from the one input port of the first input port and the second input port;
    a first output port, a second output port, and a third output port, each configured to discharge the brake fluid to a plurality of wheel brake apparatuses;
    a first inlet line configured to connect the first input port and the first output port to each other, a second inlet line configured to connect the second input port and the second output port to each other, and a third inlet line configured to connect the third input port and the third output port to each other;
    a first outlet line bifurcated from the first inlet line, the first outlet line connected to the at least one oil chamber of the plurality of oil chambers;
    a second outlet line bifurcated from the second inlet line, the second outlet line connected to a remaining oil chamber of the plurality of oil chambers;
    a third outlet line configured to connect a point in the third inlet line to at least one of the first outlet line and the second outlet line; and
    a valve mounting unit mounted with a plurality of valves for an opening operation and a closing operation of each of the first inlet line, the second inlet line, the third inlet line, the first outlet line, the second outlet line, and the third outlet line.

2. The hydraulic block of claim 1, wherein the at least one oil chamber comprises:
a first oil chamber connected to the first input port and the first output port, the first oil chamber disposed at an upper end of the first inlet line; and
a second oil chamber connected to the second input port and the second output port, the second oil chamber disposed at an upper end of the second inlet line.

3. The hydraulic block of claim 1, wherein the valve mounting unit comprises:
a first traction control valve disposed in the first inlet line, the first traction control valve configured to regulate the opening operation and the closing operation of the first inlet line; and
a second traction control valve disposed on the second inlet line, the second traction control valve configured to regulate the opening operation and the closing operation of the second inlet line.

4. The hydraulic block of claim 3, wherein the valve mounting unit is a hole mounted with:
a first inlet valve disposed between a point on the first inlet line formed at a lower end of the first traction control valve and a bifurcation with the first outlet line, the first inlet valve configured to regulate the opening operation and the closing operation of the first inlet line; and
a second inlet valve disposed between a point on the second inlet line formed at a lower end of the second traction control valve and a bifurcation with the second outlet line, the second inlet valve configured to regulate the opening operation and the closing operation of the second inlet line.

5. The hydraulic block of claim 1, wherein the valve mounting unit is mounted with:
a first outlet valve disposed in the first outlet line, the first outlet valve configured to regulate the opening operation and the closing operation of the first outlet line;
a second outlet valve disposed in the second outlet line, the second outlet valve configured to regulate the opening operation and the closing operation of the second outlet line; and
a third outlet valve disposed in the third outlet line, the third outlet valve configured to regulate an opening operation and a closing operation of the third outlet line.

6. The hydraulic block of claim 5, further comprising:
a first accumulator mounting unit configured to receive at least a part of a brake fluid discharged from the first outlet line; and
a second accumulator mounting unit configured to receive at least a part of a brake fluid discharged from the second outlet line.

7. The hydraulic block of claim 6, wherein at least one of the first accumulator mounting unit and the second accumulator mounting unit is configured to receive at least a part of a brake fluid discharged from the third outlet line.

8. A hydraulic block of an electronic braking device for a vehicle, the hydraulic block comprising:
a first input port and a second input port configured to receive a brake fluid from a main braking system;
at least one oil chamber of a plurality of oil chambers connected to one input port of the first input port and the second input port, the at least one oil chamber configured to receive and store a brake fluid from the one input port of the first input port and the second input port;
a first output port and a second output port configured to discharge the brake fluid to a plurality of wheel brake apparatuses;
a first inlet line configured to connect the first input port and the first output port to each other, and a second inlet line configured to connect the second input port and the second output port to each other;
a first outlet line bifurcated from the first inlet line, the first outlet line connected to the at least one oil chamber of the plurality of oil chambers;
a second outlet line bifurcated from the second inlet line, the second outlet line connected to a remaining oil chamber of the plurality of oil chambers;
a valve mounting unit mounted with a plurality of valves for an opening operation and a closing operation of each of the first inlet line, the second inlet line, the first outlet line, and the second outlet line;
a first pump mounting unit configured to mount a first pump connected to a point on the first inlet line; and
a second pump mounting unit configured to mount a second pump connected to a point on the second inlet line,
wherein the at least one oil chamber comprises:
a first oil chamber connected to the first input port and the first output port, the first oil chamber disposed at an upper end of the first inlet line; and
a second oil chamber connected to the second input port and the second output port, the second oil chamber disposed at an upper end of the second inlet line,
wherein:
a brake fluid flowing into the first input port is configured to pass through the first oil chamber and flow to the first pump mounting unit and the first output port; and
a brake fluid flowing into the second input port is configured to pass through the second oil chamber and flow to the second pump mounting unit and the second output port.

* * * * *